United States Patent
Kullin et al.

(10) Patent No.: US 10,197,093 B2
(45) Date of Patent: Feb. 5, 2019

(54) BEARING ARRANGEMENT

(71) Applicant: AKTIEBOLAGET SKF, Göteborg (SE)

(72) Inventors: Arne Lars Jonas Kullin, Landvetter (SE); Hans Wendeberg, Västra Frölunda (SE)

(73) Assignee: Aktiebolaget SKF, Göteborg (SE)

( * ) Notice: Subject to any disclaimer, the term of this patent is extended or adjusted under 35 U.S.C. 154(b) by 207 days.

(21) Appl. No.: 15/030,344

(22) PCT Filed: Oct. 10, 2014

(86) PCT No.: PCT/SE2014/051202
§ 371 (c)(1),
(2) Date: Apr. 18, 2016

(87) PCT Pub. No.: WO2015/057138
PCT Pub. Date: Apr. 23, 2015

(65) Prior Publication Data
US 2016/0258482 A1 Sep. 8, 2016

(30) Foreign Application Priority Data
Oct. 17, 2013 (SE) ...................................... 1300658

(51) Int. Cl.
*H02K 5/00* (2006.01)
*F16C 19/54* (2006.01)
*F16C 35/073* (2006.01)
*F03D 80/70* (2016.01)
(Continued)

(52) U.S. Cl.
CPC ............ *F16C 19/547* (2013.01); *F03D 80/70* (2016.05); *F16C 19/548* (2013.01);
(Continued)

(58) Field of Classification Search
CPC . H02K 5/00; H02K 5/17; H02K 5/173; F16C 35/073; F16C 19/00; F16C 19/22;
(Continued)

(56) References Cited

U.S. PATENT DOCUMENTS

| 2,488,929 | A |   | 11/1949 | Palumbo |
| 2,819,127 | A | * | 1/1958  | Grobey .................. F16C 19/54 |
|           |   |   |         | 384/461 |

(Continued)

FOREIGN PATENT DOCUMENTS

| CN | 101175924 A | 5/2008 |
| CN | 103075308 A | 5/2013 |
| CN | 103346639 A | 10/2013 |

*Primary Examiner* — Tran Nguyen
(74) *Attorney, Agent, or Firm* — Bryan Peckjian; SKF USA Inc. Patent Dept.

(57) ABSTRACT

The present invention relates to a bearing arrangement having a first and a second support structure for supporting a rotating member, a first rolling bearing supporting the first support structure in relation to the second support structure at a first support location, a second rolling bearing supporting the first support structure in relation to the second support structure at a second support location. The first and second rolling bearings are arranged in a coaxial configuration in relation to each other. Furthermore, the first rolling bearing forms a radially outer bearing, and the second rolling bearing is arranged radially inside the first rolling bearing by a bearing radial distance, and the first support location and second support location are axially aligned. The present invention also relates to a method for manufacturing a bearing arrangement.

14 Claims, 8 Drawing Sheets

(51) Int. Cl.
  *F16C 43/04* (2006.01)
  *H02K 5/173* (2006.01)
  *F16C 35/06* (2006.01)
  *F16C 23/08* (2006.01)
(52) U.S. Cl.
  CPC ............ *F16C 23/086* (2013.01); *F16C 35/06* (2013.01); *F16C 35/073* (2013.01); *F16C 43/04* (2013.01); *H02K 5/173* (2013.01); *F05B 2240/50* (2013.01); *F16C 2300/02* (2013.01); *F16C 2360/31* (2013.01); *F16C 2380/26* (2013.01); *Y02E 10/722* (2013.01); *Y02P 70/523* (2015.11)
(58) Field of Classification Search
  CPC ........ F16C 19/34; F16C 19/36; F16C 19/362; F16C 19/18; F16C 19/181; F16C 19/188; F16C 19/38; F16C 19/49; F16C 19/50; F16C 19/54; F16C 19/547; F16C 19/55; F16C 43/04; F16C 35/06; F03D 80/70; E04H 12/18; E04H 12/182; E04H 12/34
  See application file for complete search history.

(56) References Cited

U.S. PATENT DOCUMENTS

| | | | | |
|---|---|---|---|---|
| 2,979,367 | A * | 4/1961 | Mims | F16C 19/55 310/90 |
| 3,811,742 | A * | 5/1974 | Rosales | F16C 19/163 384/461 |
| 3,918,277 | A * | 11/1975 | Nakk | D06F 37/00 68/140 |
| 5,394,283 | A * | 2/1995 | Hans | F16C 19/55 310/90 |
| 5,820,272 | A * | 10/1998 | Nashiki | B23Q 11/0003 384/461 |
| 5,945,751 | A * | 8/1999 | Hans | H02K 5/1737 310/156.26 |
| 2006/0201076 | A1 | 9/2006 | Blackwelder | |
| 2011/0062719 | A1* | 3/2011 | Stiesdal | H02K 1/185 290/55 |
| 2012/0134610 | A1* | 5/2012 | Leuver | B65G 39/09 384/129 |

* cited by examiner

BEARING ARRANGEMENT

CROSS-REFERENCE

This application is the U.S. National Stage of International Application No. PCT/SE2014/051202 filed on Oct. 10, 2014, which claims priority to Swedish patent application no. 1300658-0 filed on Oct. 17, 2013.

FIELD OF THE INVENTION

The present invention relates to rolling element bearing arrangements, and more specifically to a rolling bearing arrangement comprising a first and a second support structure for supporting a rotating member having a main axis of rotation.

The present invention also relates to a method for manufacturing a bearing arrangement.

BACKGROUND ART

Bearing arrangements comprising two or more rolling bearings which are arranged to cooperate to axially locate a shaft or rotating member are used in a wide variety of different applications, such as motors, wheel hubs, support arrangements for shafts, electric machines, turbines, etc.

Typically, a first rolling bearing is arranged to restrict axial movement in a first axial direction and a second rolling bearings is arranged to restrict axial movement in a second axial direction being opposite to the first axial direction. Furthermore, the rolling bearings cooperate to support both radial and axial forces, as well as over turning moment of the shaft or rotating member during operation.

In order to support a shaft or rotating member in a suitable manner, different bearing arrangement configurations are known which may be adjusted for a given radial and axial load characteristics associated with a particular application. However, known designs of bearing arrangements typically require high manufacturing precision of the bearing raceways and raceway-contacting surfaces of the rolling elements, as well as high precision of the alignment between the rotating member and the housing structures of the rolling bearings at different support points along the rotational axis of the rotating member. Also, the design and complexity of the bearing geometries increase the precision and alignment requirements of the bearings, as well as increasing the mass and cost of material. Also, in order to provide suitable axial location function, the required axial extension of known rolling bearing solutions imposes high space requirements and increased overall weight. Furthermore, known designs give rise to minor material deflections leading to decrease accuracy between relative rotating members and surrounding structures, such as the housing and stator components.

SUMMARY OF THE INVENTION

In view of the above-mentioned and other drawbacks of the prior art, a general object of the present invention is to provide an improved bearing arrangement, electric machine, load bearing support arrangement, turbine arrangement and method for manufacturing a bearing arrangement.

These and other objects are met by the subject matters provided in the independent claims. Preferred embodiments of the invention are presented in the dependent claims.

According to a first aspect thereof, the present invention relates to a bearing arrangement, comprising a first and a second support structure for supporting a rotating member, which rotating member has a main axis of rotation, wherein the first support structure is arranged to rotate with the rotating member, and the second support structure is fixed and arranged to be non-rotatably mounted to a frame. The arrangement further comprises a first rolling bearing supporting, by rotatably connecting, the first support structure in relation to the second support structure at a first support location, and a second rolling bearing supporting, by rotatably connecting, the first support structure in relation to the second support structure at a second support location, which first and second rolling bearings are arranged in a coaxial configuration in relation to each other. Moreover, the first rolling bearing forms a radially outer bearing, and the second rolling bearing is arranged radially inside the first rolling bearing by a bearing radial distance, and the first support location and the second support location are axially aligned.

The invention is based on the realization by the inventors that an improved and more compact bearing arrangement is realized by providing a set of axially locating rolling bearings which are radially separated and axially aligned. By radially separating and axially aligning the first and second rolling bearing, the solution advantageously allows for axial and radial load bearing capacity while the axial width of the arrangement may be considerably decreased, thereby reducing the weight and space requirements. Considering the first rolling bearing, size and cross-section can be smaller with increasing bearing radial dimension, which allows for more optimized design in terms of compactness and weight of the first rolling bearing. For example, increased bearing radial dimension of the first rolling bearing improves the moment load bearing capability of the bearing arrangement. Also, the design according to the present invention allows for efficient mounting, dismounting and replacement of the components of the bearing arrangement and rotating member.

The bearing arrangement according to the present invention is further advantageous in that the design allows for improved operation and performance of direct driven, or gear less, applications, i.e. applications without gearbox between the rotating member and applications connected to the rotating member. For example the rotating member may form part of, or be connected to, a rotor of an electric machine, such as an electric motor or generator. In more detail, the increased radial dimension of the first rolling bearing advantageously allows for a reduced distance between the first rolling bearing and the rotor and stator members of an electric machine. The reduced distance reduces the negative effect from material deflections of the support structures portions located between the first rolling bearing and the rotor of the electric machine, thereby improving the alignment and relative orientation between the rotor and stator of the electric machine, or application. For example, this allows for an improved and more accurate airgap between the rotor and stator of an electric machine.

The bearing arrangement may for example be arranged for a rotating member having a horizontal axis, or near horizontal axis, or for a rotating member having a vertical axis, or near vertical axis.

According to an exemplifying embodiment, the contact angle of at least one of the first and second rolling bearings is angled in relation to the main axis of rotation. For example, at least one of the first and second rolling bearings, or both, is an angular contact rolling bearing, such as an angular contact roller bearing or an angular contact ball bearing, arranged to support axial loads.

According to an exemplifying embodiment, the contact angles of the first and second rolling bearings are angled in relation to the axis of rotation, wherein the first rolling bearing is arrange to axially locate the first support structure in relation to the second support structure in a first axial direction D1, and the second rolling bearing is arrange to axially locate the first support structure in relation to the second support structure in a second axial direction D2, the second axial direction being opposite the first axial direction. In other words, the first and second rolling bearings are advantageously arranged to cooperate to axially locate and fixate the first support structure in relation to the second support structure.

According to an exemplifying embodiment, the contact angle of at least one or both of the first and second rolling bearings is between 5 and 90 degrees, or between 5 and 60 degrees, or between 10 and 45 degrees, or between 15 and 25 degrees. Suitable contact angle configuration of the first and second rolling bearing allows for suitable radial and axial load bearing capacity. For example, the first rolling bearing has a relatively large contact angle and is adjusted to bear axial loads, and the second rolling bearing has a relatively small contact angle and is adjusted to bear radial loads, or vice versa. For example, the first rolling bearing has a larger axial load bearing capacity in relation to the second rolling bearing in order to bear the axial load from the weight of a tilted rotating arrangement and from the force transferred to the rotating member during operation in an application.

The contact angle may be defined as the angle between the line along which the resulting load is transmitted via a roller element from one raceway to another, typically along an axial center portion of the roller. The contact angle of the first and second bearings may also be described as the angle between the rotational axis of the rolling elements, such as rollers, and the axial direction of the rotating member.

According to an exemplifying embodiment, a first pressure center of the first rolling bearing and a second pressure center of the second rolling bearing are separated in the axial direction by a pressure center distance B. According to various exemplifying embodiment, the pressure center distance B equals or exceeds the axial width of the second rolling bearing, or 50% of the outer radius of the second rolling bearing, or the outer radius of the second rolling bearing, or the outer diameter of the second rolling bearing, or 200% of the outer diameter of the second rolling bearing, or 10 times the outer diameter of the second rolling bearing. When the contact angles of the first and second rolling bearings are tilted in the same axial direction, increased pressure center distance B facilitates reduction of angular displacement of the arrangement.

According to an exemplifying embodiment, the first rolling bearing comprises a rotating ring with a raceway for a first set of rolling elements and a non-rotating ring with raceway for the first set of rolling elements, and the second rolling bearing comprises a rotating ring with a raceway for second set of rolling elements and a non-rotating ring with raceway for the second set of rolling elements.

According to an exemplifying embodiment, the rotating ring of the first rolling bearing and the rotating ring of the second rolling bearing are mounted to the first support structure, and the non-rotating ring of the first rolling bearing and the non-rotating ring of the second rolling bearing are mounted to the second support structure.

Each one of the first and second rolling bearings comprises an inner and an outer ring, wherein one of each pair of rings is a rotating ring and the other one is a non-rotating ring.

According to an exemplifying embodiment, the rotating ring of the first rolling bearing is formed by the inner ring, and the rotating ring of the second rolling bearing is formed by the outer ring.

According to an alternative design forming an exemplifying embodiment, the rotating ring of the first rolling bearing is formed by the outer ring, and the rotating ring of the second rolling bearing is formed by the outer ring.

According to yet an alternative design forming an exemplifying embodiment, the rotating ring of the first rolling bearing is formed by the inner ring, and the rotating ring of the second rolling bearing is formed by the inner ring.

According to an additional alternative design forming an exemplifying embodiment, the rotating ring of the first rolling bearing is formed by the outer ring, and the rotating ring of the second rolling bearing is formed by the inner ring.

According to an exemplifying embodiment, the outer raceways of the first and second roller bearings are facing towards or away from each other in the axial direction. The first and second rolling bearings may also be arranged such that the outer raceways are facing in the same axial direction.

According to an exemplifying embodiment, the first and second bearings are axially displaced in relation to each other by an axial bearing distance C defined between axial centers of the first and second rolling bearings, wherein the axial bearing distance is within a distance corresponding to the outer radius of the second rolling bearing, or within a distance corresponding to the axial extension of the second rolling bearing, or within a distance corresponding to 50% of the axial extension of the second rolling bearing, or within a distance corresponding to 20% of the axial extension of the second rolling bearing.

According to an exemplifying embodiment, the bearing radial distance A equals or exceeds a distance corresponding to the axial extension of the second rolling bearing, or equals or exceeds a distance corresponding to 50% of the outer radius of the second rolling bearing, or equals or exceeds a distance corresponding to the outer radius of the second rolling bearing, or equals or exceeds a distance corresponding to 150% of the outer radius of the second rolling bearing, or equals or exceeds a distance corresponding to the outer diameter of the second rolling bearing, or equals or exceeds a distance corresponding to 200% of the outer diameter of the second rolling bearing.

According to various exemplifying embodiments, in order to form an radially separated and axially aligned configuration between the first and second rolling bearings, the bearing radial distance A is larger than, or at least two, or four, or ten times as large as, the axial bearing distance C.

According to an exemplifying embodiment, the first support structure is disc-shaped and comprises a first bearing seat with a seating surface arranged in retaining abutment with rotating ring of the first rolling bearing, and a second bearing seat with a seating surface arranged in retaining abutment with the rotating ring of the second rolling bearing, wherein the first and second bearing seats are axially aligned and radially separated in relation to each other. The bearing seats advantageously ensure correct and secure attachment of the rotating rings of the first and second rolling bearings to the first support structure.

According to a further exemplifying embodiment of the present invention, each bearing seat comprises a seat surface facing in a radially inward or radially outward direction. The seat surface may be cylindrical or tapered.

According to an exemplifying embodiment, the first and/or second rolling bearing is a tapered roller bearing, spherical roller thrust bearing, angular contact spherical roller bearing, toroidal roller bearing, angular contact toroidal roller bearing, a cylindrical roller bearing, or a combination of two of these rolling bearing types. For example, according to an exemplifying embodiment, the first and/or second rolling bearing is a ball bearing, allowing for reduced friction. Also, the large contact zone provided by the large radial dimension of the first rolling bearing allows for suitable load bearing properties and durability of the ball bearing.

Common for both spherical roller and toroidal roller bearing types is that each raceway of each bearing has a curved cross-section when taken in a plane coinciding with the axial direction of the inner or outer rings. Also, each roller is provided with a raceway contacting surface having a curved cross-section when taken in a plane coinciding with the rotational axis of the roller. In other words, the rollers are barrel-shaped having a convex raceway-contacting surface. Furthermore, for a spherical type bearing, the curvature of the outer raceway has a radius of curvature corresponding to, or being equal to, the radius of the outer raceway and the rollers are arranged to move in relation to the outer raceway and travel with the inner raceway during self-aligning movement of the spherical bearing. For a toroidal type bearing, the curvature of the outer raceway has a radius of curvature exceeding the radius of the outer raceway, which allows for some axial displacement of the rollers in relation to the raceway, wherein the rollers are arranged to move in relation to both the outer raceway and the inner raceway during self-aligning movement of the toroidal bearing. For example, for the toroidal type bearing, the ratio between the curvature radius and the raceway radius is more than 1.1, or 1.2, or 1.5, 2, or 5.

According to an exemplifying embodiment, the first rolling bearing and/or the second rolling bearing is a single row rolling bearing, i.e. comprising only a single row of rolling elements, such as a single row spherical roller bearing or a single row toroidal roller bearing. Hence, the first support structure and the rotating member are only supported by the first rolling bearing at the first support location, wherein the first rolling bearing comprises only one row of rollers which axially locate the rotating member in the first axial direction. In analogy, the first support structure and the rotating member may only be supported by the second rolling bearing at the second support location, wherein the second rolling bearing comprises only one row of rollers which axially locate the rotating member in the second axial direction.

For example, the normal direction of the contacting surface of the first and/or second bearing raceways along the complete, or full length of the, raceway along the axial direction, is inclined in relation to the radial direction of the rotating member.

According to an embodiment, the second support structure further comprises an axial center bore allowing for reduced weight and access-way to the first support structure and the rotating member, such as a rotor device of an electric machine. A rotor device may e.g. comprise connectors or electro/magnetic devices coupled to the external control units via the access-way formed by the center bore. Also, the outer non-rotating ring of the second rolling bearing may be mounted inside the axial center bore of the second support structure.

According to various embodiments of the bearing arrangement, the first and/or second rolling bearings may be arranged with a positive internal operational clearance, negative internal operational clearance, or no internal operational clearance. For example, the bearings may be arranged to have substantially no axial play, or be arranged with a suitable axial play, depending on the preferred design of the application. The bearings may also be arranged with an operational clearance, or play, in the radial direction. The bearings may alternatively be arranged with a negative operational clearance, i.e. a preload, in order to e.g. enhance the stiffness of the bearing arrangement or to increase running accuracy. For example, the application of a preload may be provided by springs in order to prevent bearing damage as a result of sliding movements of the rolling elements.

Furthermore, the first and/or second rolling bearings may, according to various embodiments, be separable bearings, wherein the inner and outer rings and the set of rolling elements are separable from each other. Alternatively, the rolling bearings may be self-retaining such that the set of rolling elements and the inner and outer ring form a self-retaining bearing unit. For example, self-retention may be provided by provision of e.g. retention rings, retention sleeves, or retaining cages. The rolling bearings may also be semi-self-retaining such that only the set of rolling elements and one of the inner or outer rings form a self-retaining unit.

Moreover, according to alternative further embodiments of the bearing arrangement, the first and/or second rolling bearings may be provided with a coating for improved performance and operational reliability. In more detail, a suitable durable coating may be applied the respective rolling elements, inner raceways, outer raceways, inner rings, and/or outer rings. Also, a complete rolling bearing may be coated. For example, problems such as micropitting, smearing and inclusion-generated brittle flaking, and similar wear generated by e.g. high shear forces may be alleviated with a coating. A coating may also be employed to reduce or avoid asperity interaction between rolling elements and raceways and/or for dynamic polishing of the raceways during operation. According to various embodiments, the coating may be based on or comprise carbon, oxide, chromium, zinc, manganese and/or phosphate compounds. According to a further embodiment, the coating may be arranged to reduce or avoid dielectric breakdown of the rolling bearing components, for example by using a ceramic based coating acting as insulation.

In addition, according to further exemplifying embodiments, the bearing arrangement may be equipped with sensors and measuring device for controlling the operation of the arrangement and for collected operational data in order to analyze maintenance requirements and to plan servicing activities. Sensors and measuring devices may also be use for detecting non-regular operation of the arrangement. Sensors and measuring devices may arranged to measure temperature, rotational speed, forces, vibration, currents alignment, but are not limited to those parameters. Data may be collected and communicated via cable or wireless communication network to a control unit or to a central analysis system.

According to an exemplifying embodiment of the present invention, it relates to a electric machine comprising a bearing arrangement according to any one of the preceding embodiments, wherein the frame forms an electric machine housing, the first support structure forms parts of a rotor of the electric machine, and the electric machine further comprises a stator attached to the electric machine housing, which stator cooperates with the rotor during operation. Thereby, a more compact and lightweight electric machine, such as a motor or generator, is provided. In particular, the axial dimension of the electric machine may be reduced while allowing for durable operation with high performance and higher precision between the rotor and stator members of the electric machine. For example, according to an exemplifying embodiment, the rotor and stator members are arranged on a radially outer side of the first rolling bearing, wherein the rotor member is attached to the first support structure and the stator member is attached to the second support structure.

According to a further exemplifying embodiment of the present invention, it relates to a load bearing support arrangement for rotatably supporting a shaft, which load bearing support arrangement comprises a bearing arrangement according to any one of the preceding embodiments. The shaft may form part of a motor, or machine, wherein the bearing arrangement advantageously support high overturning moments while imposing reduced axial space requirements. Also, material deflections leading to misalignment between the first and second support structure are at a radially outer portion of the first and second support structure are advantageously reduced by the radially outer placement of the first rolling bearing.

According to yet an exemplifying embodiment of the present invention, it relates to a turbine arrangement comprising a bearing arrangement according to any one of the above described embodiments, wherein the frame forms a nacelle frame of a turbine, and the second support structure is mounted to the nacelle frame. Furthermore, the arrangement comprises a hub unit provided with rotor blades, which hub unit is mounted to the first support structure.

The turbine arrangement may further include a generator device comprising a rotor member mounted to the first support structure and a stator member mounted to the second support structure. For example, according to an exemplifying embodiment, the generator device is arranged on a radially outer side of the first rolling bearing. The turbine arrangement may further include a yaw rotation device for turning the complete nacelle frame and housing around a yaw axis.

According to a further aspect thereof, the present invention relates to a method for manufacturing a bearing arrangement having a main axis of rotation, which method comprises providing:
- a first support structure for supporting a rotating member and arranging the first support structure to rotate with the rotating member,
- a second support structure for supporting the rotating member, and arranging the second support structure to be non-rotatably mounted to a frame,
- a first rolling bearing and arranging it to support the first support structure in relation to the second support structure at a first support location, and
- a second rolling bearing and arranging it to support the first support structure in relation to the second support structure at a second support location, The method further comprising arranging the first and second rolling bearings in a coaxial configuration in relation to each other, arranging the first rolling bearing as a radially outer bearing, providing the second rolling bearing radially inside the first rolling bearing by a bearing radial distance, and axially aligning the first support location and second support location in relation to each other.

The method provides an improved bearing arrangement which is advantageous in similar manners as described in relation to the first aspect of the present invention.

By being non-rotating, the second support structure is to be understood to be fixed in relation to the main rotating movement of the first support structure during operation. However, the non-rotating support structure may undergo other rotational movements, such as rotational movement when a complete unit comprising the bearing arrangement is rotated by yawing movement in order to achieve suitable operation and favorable conditions for a specific application of the bearing arrangement.

Generally, other objectives, features, and advantages of the present invention will appear from the following detailed disclosure, from the attached dependent claims as well as from the drawings are equally possible within the scope of the invention.

BRIEF DESCRIPTION OF DRAWINGS

Embodiments of the invention will now be described, by way of example, with reference to the accompanying drawings, wherein:

FIG. 1b is an enlarged partial schematic cross-sectional view of the embodiment of the bearing arrangement in FIG. 1a.

Figure 1A:
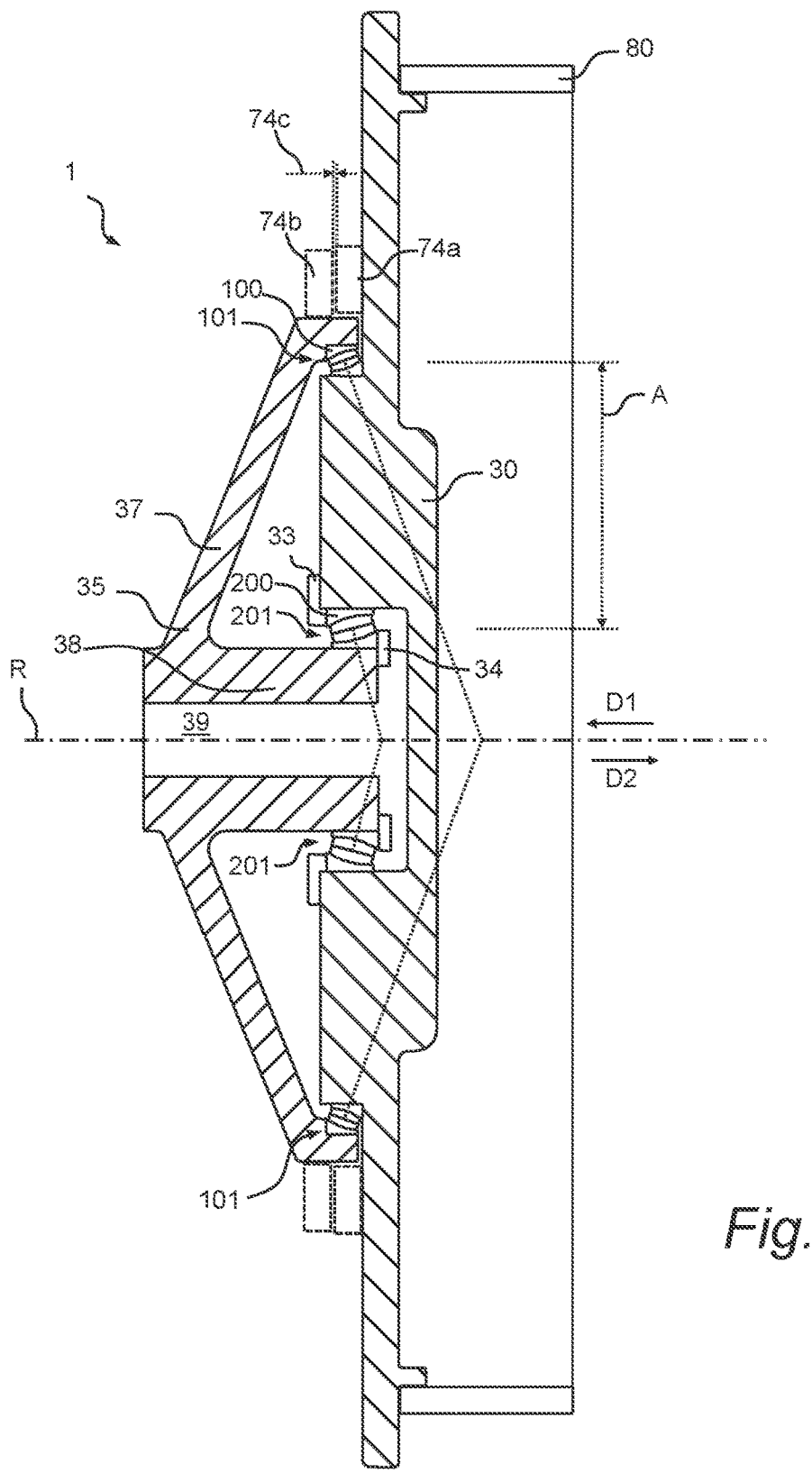
FIG. 1a is a schematic cross-sectional view of an embodiment of the bearing arrangement according to the present invention.

It should be understood that the drawings are not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

In the drawings, similar, or equal elements are referred to by equal reference numerals.

Figure 1B:
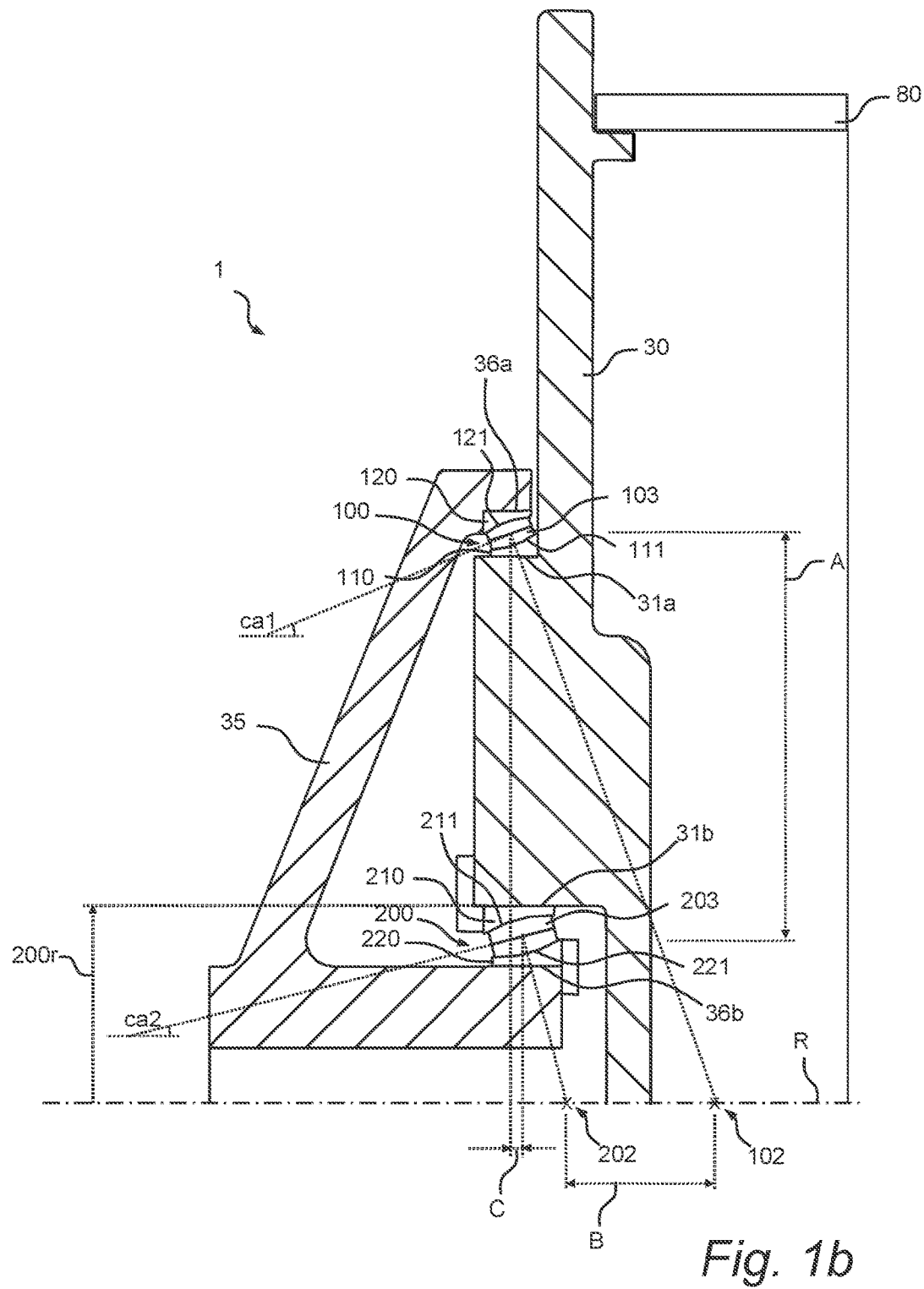

In FIG. 1a, a schematic cross-sectional view of an embodiment of the bearing arrangement 1 according to the present invention, is illustrated. An enlarged partial schematic cross-sectional view of the embodiment is illustrated in FIG. 1b.

The arrangement 1 comprises a first support structure 30 and a second support structure 35 which are rotationally connected in relation to a main axis of rotation R of the arrangement. The first support structure 30 is arranged to rotate with rotating member 80 formed by a hollow shaft, and the second support structure 35 is fixed and arranged to be non-rotatably mounted to a frame e.g. an electric machine housing.

A first rolling bearing 100 of self-aligning type supports and rotatably connects the first support structure 30 to the second support structure 35 at a first support location 101. A second rolling bearing 200 of self-aligning type supports and rotatably connects the first support structure to the second support structure at a second support location 201. The first and second rolling bearings 100 and 200 are arranged in a coaxial configuration in relation to each other along rotational axis R, and cooperate to axially locate the first support structure 30 to the second support structure 35 in a stiff configuration, i.e. with reduced self-aligning capability.

The second support structure 35 comprises a radially outer member 37 extending radially outward to the first support location 101, at which the first rolling bearing 100 is attached. The second support structure 35 further comprises a radially inner member 38 extending axially to the second support location 201, at which the second rolling bearing 200 is attached. As illustrated, the second support structure 35 comprises a center bore 39 extending axially through the second support structure 35. A locking device 33 is arranged to secure the second rolling bearing 200 to the first support structure 30, and a locking device 34 is arranged to secure the second rolling bearing 200 to the second support structure 35. The outer radius of the second rolling bearing is indicated by 200r.

The first rolling bearing 100 is arranged in an radially outer position, and the second rolling bearing 200 is arranged radially inside the first rolling bearing by a bearing radial distance A, defined between the radial centers of the first and second rolling bearings 100 and 200, as indicated in FIGS. 1a-b. As further shown, the first support location 101 and second support location 201 are axially aligned, such that axial position of the first and second rolling bearings 100 and 200 are essentially aligned. This design advantageously supports large moments, as well as large radial and axial loads, while providing optimized weight and compactness of the turbine in the axial direction.

The contact angle of the first and second rolling bearings 100 and 200 is inclined in relation to the axis of rotation in order to provide for axial locking between the support structures 30 and 35. The contact angle ca1 of the first rolling bearing 100 prevents to first support structure 30 from displacement in the first axial direction D1, and the contact angle ca2 of the second rolling bearing prevents the first support structure 30 from displacement in the second axial direction D2. A first pressure center 102 of the first rolling bearing 100 along the rotational axis R is determined by the contact angle ca1, and a second pressure center 202 of the second rolling bearing 200 along the rotational axis R is determined by the contact angle ca2. As illustrated by load lines, the first and second pressure centers 102 and 202 are axially separated from each other by a pressure center distance B. A sufficient pressure center distance B advantageously enables the bearing arrangement 1 to support moments while having a compact and axially aligned geometry of the first and second rolling bearings, such as self-aligning bearings. In other words, the pressure center distance B may be employed to off-set the spherical self-aligning geometries of the first and second rolling bearings 100 and 200, such that a stiff moment bearing design based on self-aligning bearings may be provided.

In FIGS. 1a-b, the first and second rolling bearings are inclined in the same direction, i.e. their outer raceways are tilted and facing towards the same axial direction D2.

As further illustrated, the first and second bearings 100 and 200 are axially aligned such that an advantageous axially compact design is provided. In more detail, first and second bearings 100 and 200 are axially displaced in relation to each other only by a limited axial bearing distance C defined between axial centers of the first and second rolling bearings 100 and 200, as indicated, such that the bearing arrangement 1 has a pancake type architecture.

The radially separated first and second rolling bearings 100 and 200 may be arranged to have substantially no axial play, or be arranged with a suitable axial play, depending on the application and associated operational conditions.

As further shown in FIGS. 1a-b, the bearing arrangement 1 is provided with a first and second rolling bearings 100 and 200 of different size and load bearing capacity. Thereby, the arrangement is configured for different axial load bearings capacity in the first and second axial directions, allowing for a manufacturing of compact arrangement with reduced weight.

Considering the first rolling bearing 100, it is a spherical type roller bearing comprising an inner ring which forms the rotating ring 110, an outer ring which forms the non-rotating ring 120, and a set of rolling elements 103 formed of rollers arranged in an intermediate configuration between the inner and outer rings. The second rolling bearing 200 is a spherical type roller bearing comprising an outer ring which forms the rotating ring 210, an inner ring which forms the non-rotating ring 220, and a set of rolling elements 203 formed of rollers arranged in an intermediate configuration between the inner and outer rings.

In more detail, the rotating inner ring 110 is attached to and fixated in relation the first support structure 30, at bearing seat 31a. The outer non-rotating ring 120 is attached to and fixated in relation to the second support structure 35, at bearing seat 36a. The rotating outer ring 210 is attached to and fixated in relation the first support structure 30, at bearing seat 31b, and the inner non-rotating ring 220 is attached to and fixated in relation to the second support structure 35, at bearing seat 36b.

The set of rolling elements 103 are circumferentially arranged in a row around the rotating inner ring 110, and the set of rolling elements 203 are circumferentially arranged in a row around the non-rotating inner ring 210. As shown, each rolling element is formed of a symmetrical bearing roller and has a curved raceway-contacting surface arranged in contact with a curved raceways of the inner and outer rings 110 and 120; and 210 and 220. Each roller has a symmetrical convex, or barrel-shaped, profile, i.e. an axially center portion having an increase radial width in relation to the opposite axial end portions.

As further illustrated, the bearing arrangement 1 may form part of an electric machine, that is, an electromechanical energy converter which converts electricity to mechanical power (i.e., electric motor) or mechanical power to electricity (i.e., electric generator), based on rotational movement. Rotor member 74a is attached to a portion of the first support structure 30. As shown, the rotor may be located radially outside and/or adjacent the first rolling bearing 100, but is not limited to this configuration. As further illustrated, a stator member 74b is attached to a radially outer portion of the second support structure 35. As shown, the stator may be located radially outside and/or adjacent the first rolling bearing 100, but is not limited to this configuration. The rotor 74a and stator 74b are separated by an airgap 74c extending the in an axial direction coinciding the main axis of rotation R. The airgap may also instead have a radial configuration wherein the airgap extends in the radial direction, or have a conical geometry in relation the main axis of rotation R.

The stator and rotor may also be located radially between the first and second rolling bearing, or radially inside the second rolling bearing 200.

Figure 2:
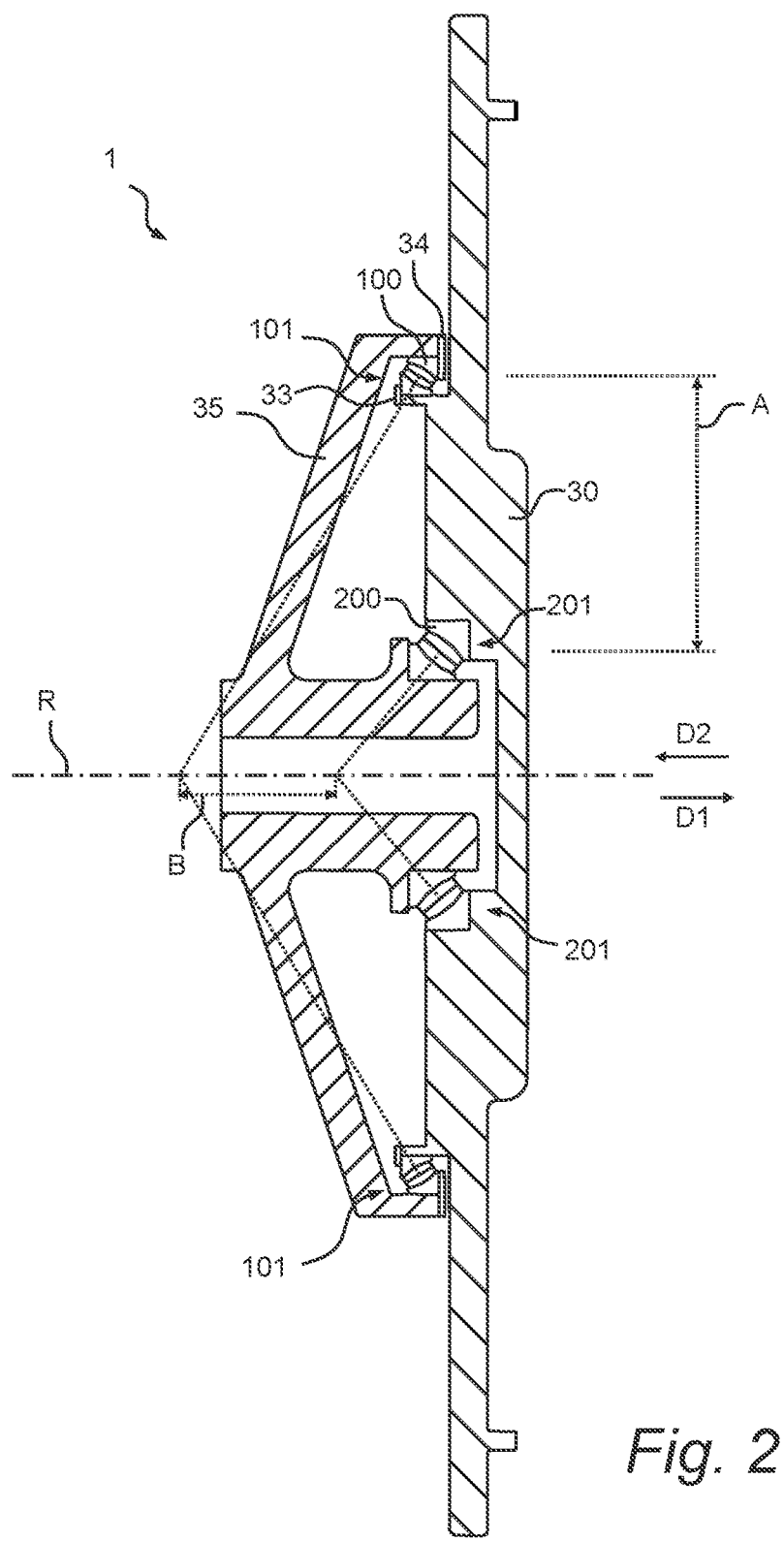
FIG. 2 is a schematic perspective view of an embodiment of the bearing arrangement according to the present invention.

FIG. 2 is a schematic perspective view of an embodiment of the bearing arrangement according to the present invention is illustrated, which arrangement is arranged and configured in a similar manner as the bearing arrangement as described with reference to FIG. 1a-b, unless stated or illustrated differently. In particular, the bearing arrangement 1 in FIG. 2 differs in that the first and second rolling bearings are arranged in an alternative configuration.

As shown the bearing seats are adjusted to support the first and second rolling bearings in alternative axial directions. In more detail the first and second rolling bearings are inclined in the opposite axial direction in comparison with the embodiment described with reference to FIGS. 1a-b. The outer raceways of the first and second rolling bearings are tilted and facing towards the same axial direction D2, as indicated in FIG. 2.

Locking device 33 is arranged to secure the first rolling bearing 100 to the first support structure 30, and locking device 34 is arranged to secure the first rolling bearing 100 to the second support structure 35. The bearing arrangement 1 may further support a rotating member and/or be arranged with rotor and stator in a similar manner as described with reference to FIGS. 1a-b.

Figure 3:
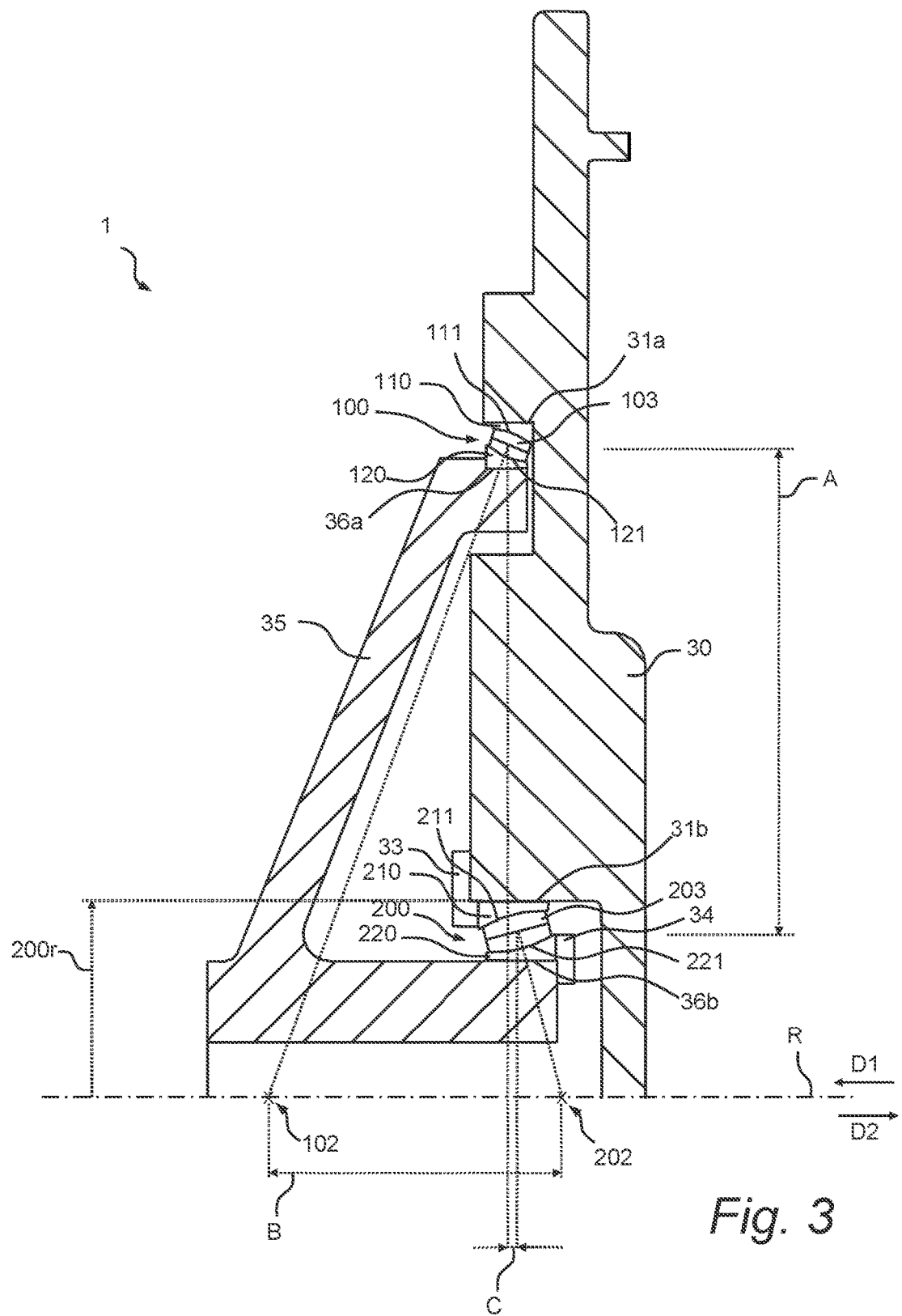
FIG. 3 is an enlarged partial schematic cross-sectional view of an embodiment of the bearing arrangement according to the present invention.

In FIG. 3, an enlarged partial schematic cross-sectional view of an embodiment of the bearing arrangement according to the present invention is illustrated, which arrangement is arranged and configured in a similar manner as the bearing arrangement as described with reference to FIG. 1a-b, unless stated or illustrated differently. In particular, the bearing arrangement 1 in FIG. 3 differs in that the first and second rolling bearings are arranged in an alternative configuration.

In more detail, the first rolling bearing 100 is a roller bearing comprising an outer ring which forms the rotating ring 110, an inner ring which forms the non-rotating ring 120, and a set of rolling elements 103 formed of rollers arranged in an intermediate configuration between the inner and outer rings. The second rolling bearing 200 is a roller bearing comprising an outer ring which forms the rotating ring 210, an inner ring which forms the non-rotating ring 220, and a set of rolling elements 203 formed of rollers arranged in an intermediate configuration between the inner and outer rings.

Furthermore, the rotating outer ring 110 is attached to and fixated in relation the first support structure 30, at bearing seat 31a. The inner non-rotating ring 120 is attached to and fixated in relation to the second support structure 35, at bearing seat 36a. The rotating outer ring 210 is attached to and fixated in relation the first support structure 30, at bearing seat 31b, and the inner non-rotating ring 220 is attached to and fixated in relation to the second support structure 35, at bearing seat 36b.

The set of rolling elements 103 are circumferentially arranged in a row around the non-rotating inner ring 120, and the set of rolling elements 203 are circumferentially arranged in a row around the non-rotating inner ring 220. The bearing seats are adjusted to support the first and second rolling bearings in alternative axial directions. In more detail the first and second rolling bearings are inclined in the opposite axial direction in relation to each other. The outer raceway of the first rolling bearing 100 is tilted and faces towards the axial direction D1. Locking device 33 is arranged to secure the second rolling bearing 200 to the first support structure 30, and locking device 34 is arranged to secure the second rolling bearing 200 to the second support structure 35. The bearing arrangement 1 may further support a rotating member and/or be arranged with rotor and stator in a similar manner as described with reference to FIGS. 1a-b.

Figure 4:
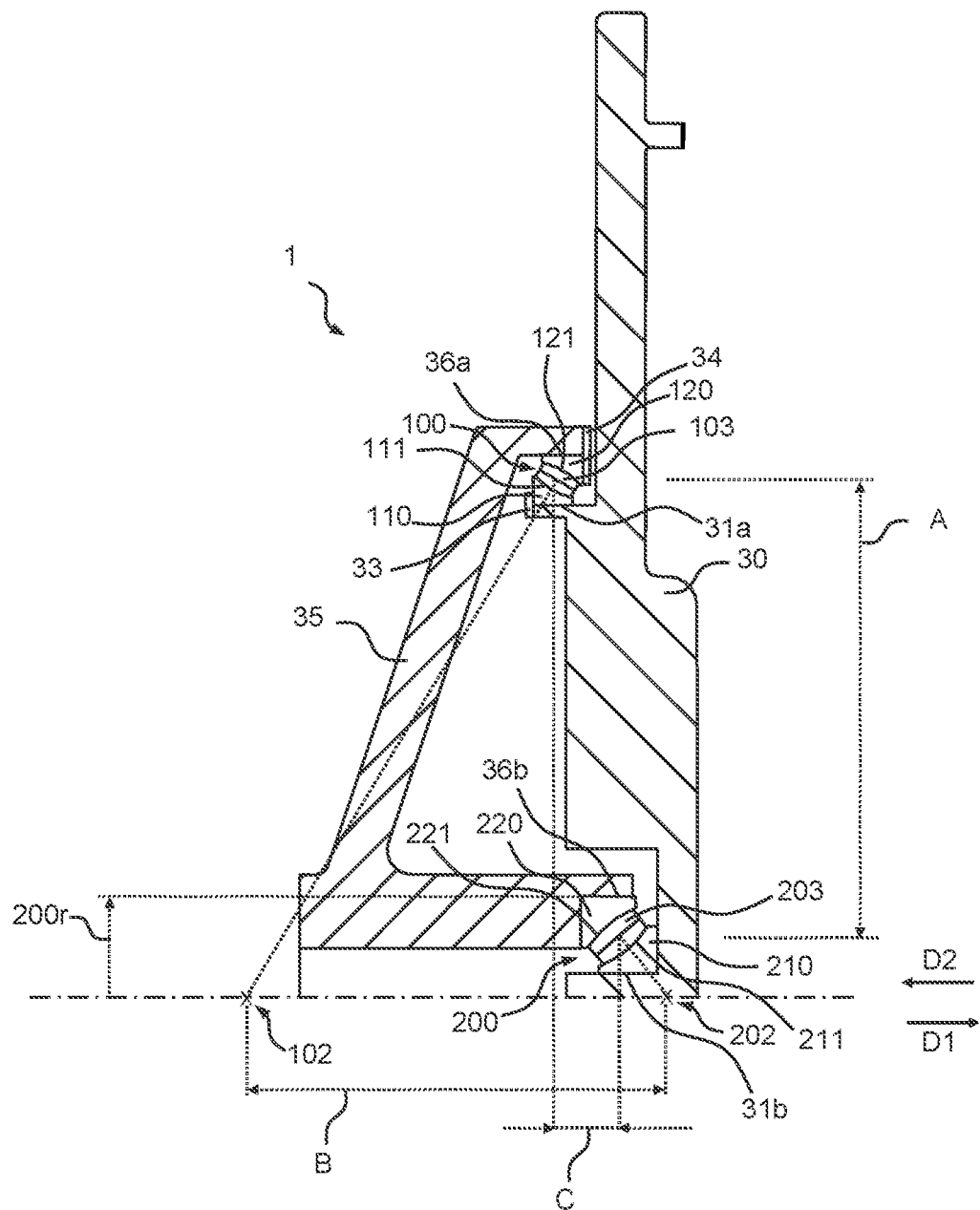
FIG. 4 is an enlarged partial schematic cross-sectional view of an embodiment of the bearing arrangement according to the present invention.

FIG. 4 is an enlarged partial schematic cross-sectional view of an embodiment of the bearing arrangement 1 according to the present invention, which arrangement is arranged and configured in a similar manner as the bearing arrangement as described with reference to FIG. 1a-b, unless stated or illustrated differently. In particular, the bearing arrangement 1 in FIG. 4 differs in that the first and second rolling bearings are arranged in an alternative configuration.

In more detail, the first rolling bearing 100 is a roller bearing comprising an inner ring which forms the rotating ring 110, an outer ring which forms the non-rotating ring 120, and a set of rolling elements 103 formed of rollers arranged in an intermediate configuration between the inner and outer rings. The second rolling bearing 200 is a roller bearing comprising an inner ring which forms the rotating ring 210, an outer ring which forms the non-rotating ring 220, and a set of rolling elements 203 formed of rollers arranged in an intermediate configuration between the inner and outer rings.

Furthermore, the rotating inner ring 110 is attached to and fixated in relation the first support structure 30, at bearing seat 31a. The outer non-rotating ring 120 is attached to and fixated in relation to the second support structure 35, at bearing seat 36a. The rotating inner ring 210 is attached to and fixated in relation the first support structure 30, at bearing seat 31b, and the outer non-rotating ring 220 is attached to and fixated in relation to the second support structure 35, at bearing seat 36b.

The set of rolling elements 103 are circumferentially arranged in a row around the rotating inner ring 110, and the set of rolling elements 203 are circumferentially arranged in a row around the rotating inner ring 210. The bearing seats are adjusted to support the first and second rolling bearings in alternative axial directions. In more detail the first and second rolling bearings are inclined in the opposite axial direction in relation to each other. The outer raceway of the first rolling bearing 100 is tilted and faces towards the axial direction D2, as indicated. The bearing arrangement 1 may further support a rotating member and/or be arranged with rotor and stator in a similar manner as described with reference to FIGS. 1a-b.

Figure 5:
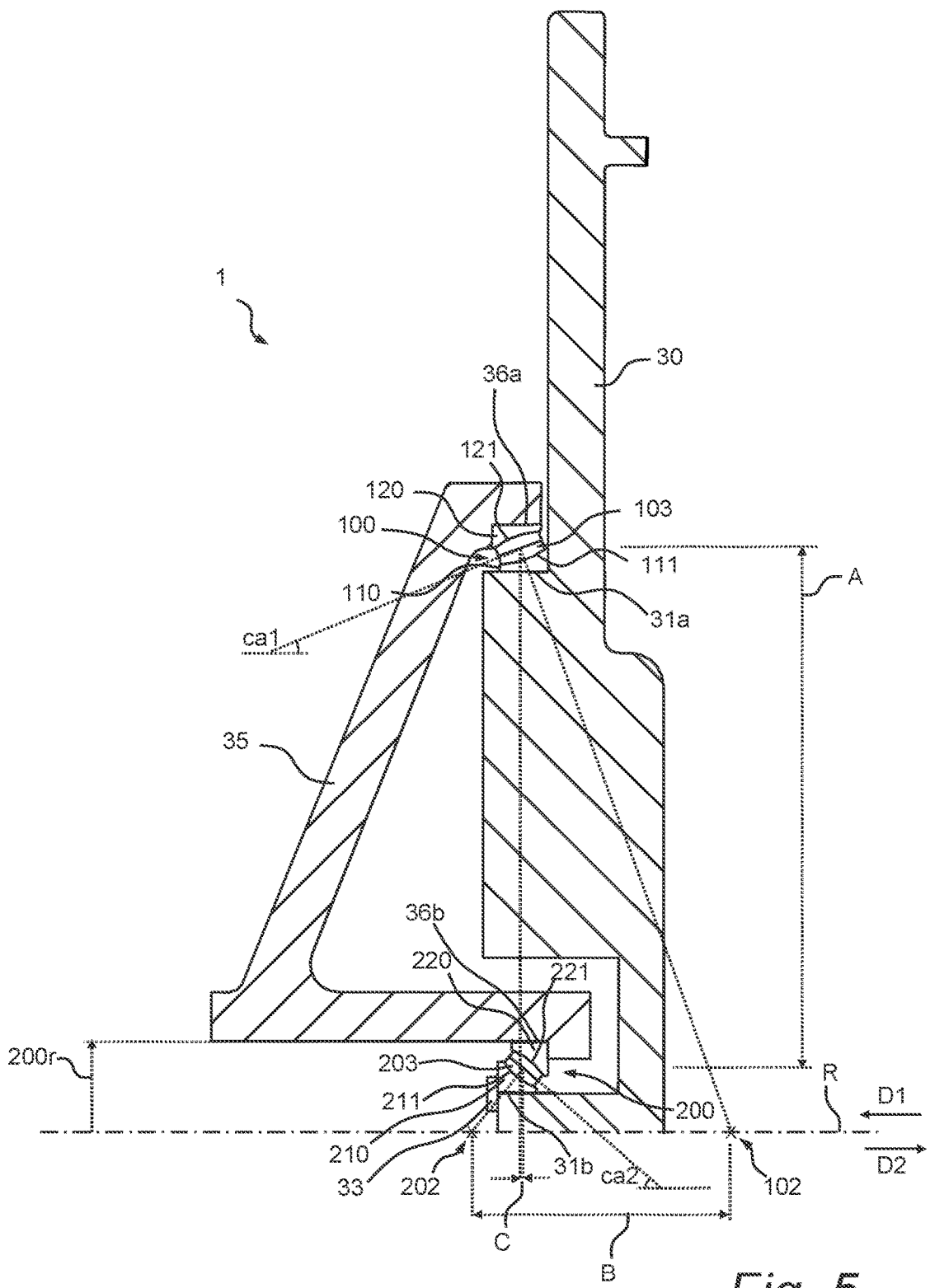
FIG. 5 is an enlarged partial schematic cross-sectional view of an embodiment of the bearing arrangement according to the present invention.

FIG. 5 is an enlarged partial schematic cross-sectional view of an embodiment of the bearing arrangement 1 according to the present invention, which arrangement is arranged and configured in a similar manner as the bearing arrangement as described with reference to FIG. 1a-b, unless stated or illustrated differently. In particular, the bearing arrangement 1 in FIG. 5 differs in that the first and second rolling bearings are arranged in an alternative configuration.

In more detail, the first rolling bearing 100 is a roller bearing comprising an inner ring which forms the rotating ring 110, an outer ring which forms the non-rotating ring 120, and a set of rolling elements 103 formed of rollers arranged in an intermediate configuration between the inner and outer rings. The second rolling bearing 200 is a roller bearing comprising an inner ring which forms the rotating ring 210, an outer ring which forms the non-rotating ring 220, and a set of rolling elements 203 formed of rollers arranged in an intermediate configuration between the inner and outer rings.

Furthermore, the rotating inner ring 110 is attached to and fixated in relation the first support structure 30, at bearing seat 31a, which bearing seat 31a is facing in a radially outward direction. The outer non-rotating ring 120 is attached to and fixated in relation to the second support structure 35, at bearing seat 36a facing in a radially inward direction. The rotating inner ring 210 is attached to and fixated in relation to the first support structure 30, at bearing seat 31b facing in the radially outward direction, and the outer non-rotating ring 220 is attached to and fixated in relation to the second support structure 35, at bearing seat 36b facing in the radially inward direction.

The set of rolling elements 103 are circumferentially arranged in a row around the rotating inner ring 110, and the set of rolling elements 203 are circumferentially arranged in a row around the rotating inner ring 210. The bearing seats are adjusted to support the first and second rolling bearings in alternative axial directions. In more detail the first and second rolling bearings are inclined in the opposite axial direction in relation to each other. Locking device 33 is arranged to secure the second rolling bearing 200 to the first support structure 30.

The bearing arrangement 1 may further support a rotating member and/or be arranged with rotor and stator in a similar manner as described with reference to FIGS. 1a-b.

Figure 6:
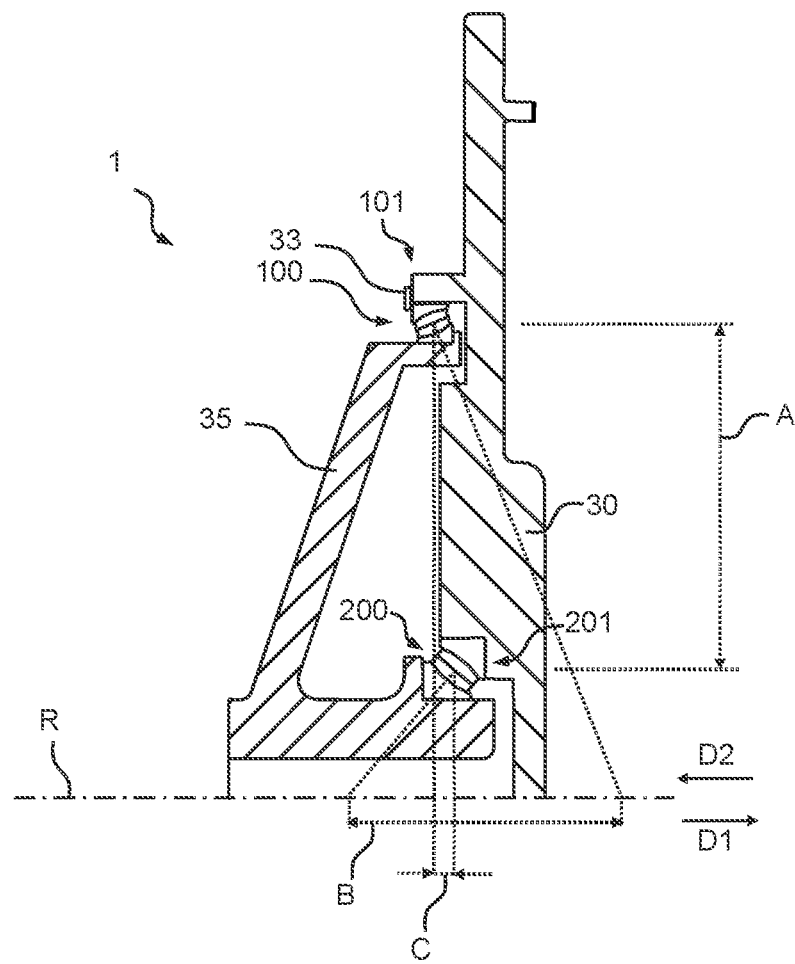
FIG. 6 is an enlarged partial schematic cross-sectional view of an embodiment of the bearing arrangement according to the present invention.

FIG. 6 is an enlarged partial schematic cross-sectional view of an embodiment of the bearing arrangement 1 according to the present invention, which arrangement is arranged and configured in a similar manner as the bearing arrangement as described with reference to FIG. 1a-b, unless stated or illustrated differently. In particular, the bearing arrangement 1 in FIG. 6 differs in that the first and second rolling bearings are arranged in an alternative configuration.

In more detail, the first rolling bearing 100 is a roller bearing comprising an outer ring which forms the rotating ring, an inner ring which forms the non-rotating ring, and a set of rolling elements formed of rollers arranged in an intermediate configuration between the inner and outer rings. The second rolling bearing 200 is a roller bearing comprising an outer ring which forms the rotating ring, an inner ring which forms the non-rotating ring, and a set of rolling elements formed of rollers arranged in an intermediate configuration between the inner and outer rings.

Furthermore, the rotating outer ring of the first rolling bearing is attached to and fixated in relation the first support structure 30, at a bearing seat is facing in a radially inward direction. The inner non-rotating ring is attached to and fixated in relation to the second support structure 35, at a bearing seat facing in a radially outward direction. The rotating outer ring of the second rolling bearing is attached to and fixated in relation the first support structure 30 at bearing seat facing in the radially inward direction, and the inner non-rotating ring is attached to and fixated in relation to the second support structure 35 at a bearing seat facing in the radially outward direction.

The set of rolling elements of the first rolling bearing are circumferentially arranged in a row around the non-rotating inner ring, and the set of rolling elements of the second rolling bearing are circumferentially arranged in a row around the non-rotating inner ring. The bearing seats are adjusted to support the first and second rolling bearings in alternative axial directions. In more detail the first and second rolling bearings are inclined in the opposite axial direction in relation to each other. Locking device 33 is arranged to secure the first rolling bearing 100 to the first support structure 30, by securing the rotating outer ring of the first rolling bearing 100 to the bearing seat of the first support structure 30. The bearing arrangement 1 may further support a rotating member and/or be arranged with rotor and stator in a similar manner as described with reference to FIGS. 1a-b.

Figure 7:
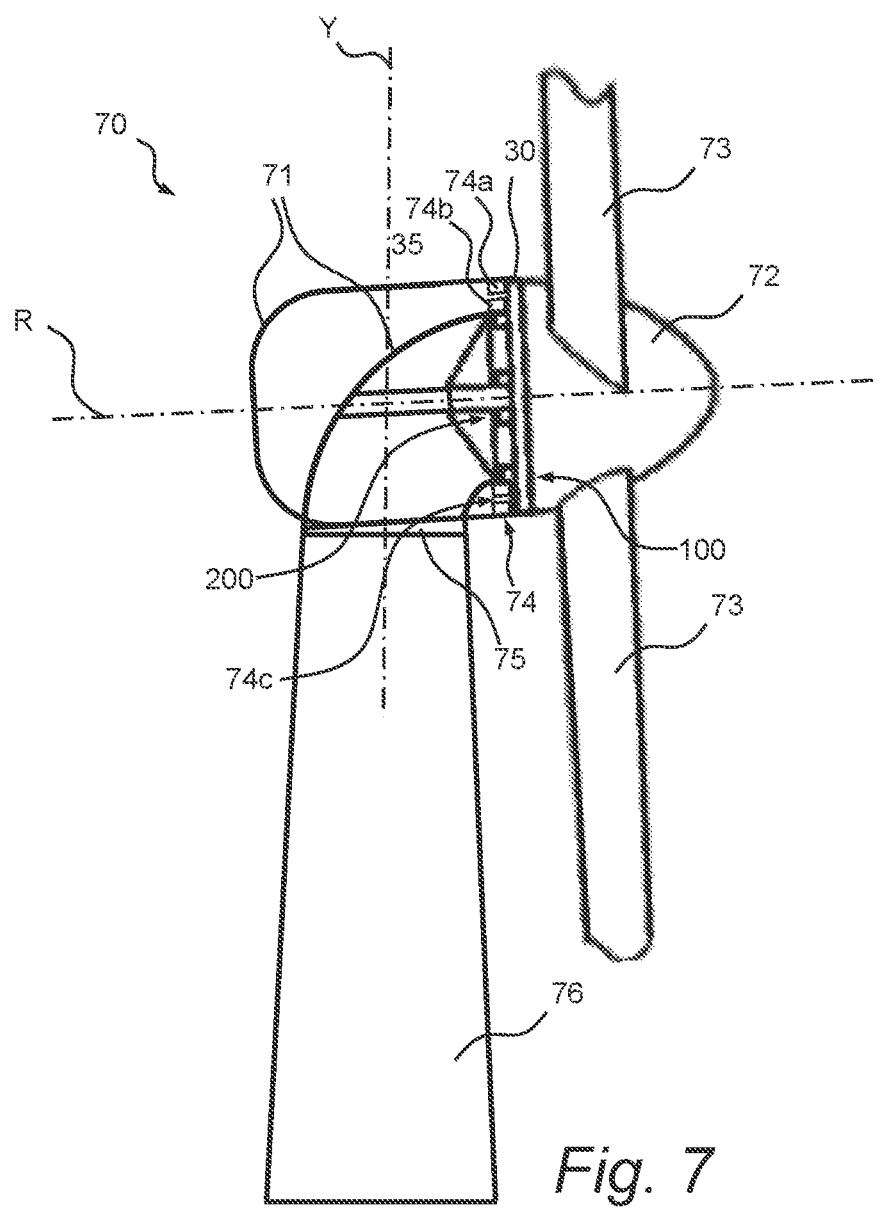
FIG. 7 is a partial schematic view of a turbine arrangement comprising an embodiment of the bearing arrangement according to the present invention.

In FIG. 7, a schematic partial side view of a turbine arrangement 70 comprising an embodiment of the bearing arrangement 1 according to the present invention is shown. As illustrated, a hub unit 72 comprising fixed or pitchable blades 73 are attached to the first support structure 30 which is rotationally connected to the second support structure 35 via first and second rolling bearings 100 and 200. The second support structure 35 is secured to a nacelle frame 71 anchored to a turbine tower-like structure 76 via a yaw rotation device 75 arranged to rotate the nacelle around yaw axis Y.

As further shown, the turbine arrangement 70 comprises a direct drive electric generator 74 comprising rotor member 74a attached to the first support structure 30 radially outside and adjacent the first rolling bearing 100, and a stator member 74b attached to the second support structure 35 radially outside and adjacent the first rolling bearing 100. The rotor 74a and stator 74b are separated by an airgap 74c extending the in an radial direction. The airgap may instead have an axial configuration wherein the airgap extends in the axial direction between the rotor and stator, or have a conical geometry in relation the main axis of rotation R.

The generator may also be connected to the rotating first support structure 30 and hub unit 72 which a shaft extending through a central bore in the second support structure. The generator may be directly coupled to the first support structure, or via a gearbox shifting the rotational speed of the rotor.

Furthermore, the bearing arrangement 1 may according to an embodiment form part of a hydraulic turbine arrangement comprising a hydraulic drive-train for driving a generator. For example, the rotor may be coupled to a hydraulic pump arranged in the nacelle and which is coupled to a ground-based hydraulic motor and generator arrangement, such as an in-line or bent-axis generator motor.

The bearing arrangement 1 may also, according to an embodiment, form part of a turbine arrangement comprising a gear transmission arranged for driving a generator. For example, the rotor may be coupled to an input side of a gearbox via a rotor shaft, wherein an output side of the gearbox is coupled to a generator operating at a different rotational speed in relation to the rotational speed of the turbine rotor during operation. With reference to FIG. 1a, the rotor shaft may be arranged to extend through the center bore 39 extending axially through the second support structure 35, wherein the rotor shaft is connected to the first support structure 30.

The bearing arrangement 1 is not limited to a horizontal type orientation and may also be used in turbines applications involving vertical type rotor shaft orientations. The orientation of the rotor shaft is defined in relation to its intended mounted operational position in a nacelle framing of an operational turbine.

The rolling bearings 100 and 200 may for example be attached to the bearing seats of the support structures 30 and 35 by means of press-fitting techniques and/or by using a suitable locking device, such as locking device 33, shown in FIG. 1a.

It should be noted that the invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality. A single apparatus or other unit may fulfill the functions of several items recited in the claims. The mere fact that certain features or method steps are recited in mutually different dependent claims does not indicate that a combination of these features or steps cannot be used to advantage.

The invention claimed is:

1. A bearing arrangement comprising:
a bearing having a first support structure and a second support structure;
a rotating member supported by the bearing, the rotating member having a main axis of rotation (R), wherein the first support structure is configured to rotate with the rotating member, and the second support structure is fixed and configured to be non-rotatably mounted to a frame,
a first rolling bearing supporting the first support structure in relation to the second support structure at a first support location,
a second rolling bearing supporting the first support structure in relation to the second support structure at a second support location, wherein the first and second rolling bearings are arranged in a coaxial configuration in relation to each other, wherein
the first rolling bearing forms a radially outer bearing, and the second rolling bearing is arranged radially inside the first rolling bearing by a bearing radial distance (A), and
wherein the first rolling bearing and the second rolling bearing partially axially overlap, the rotating member being a hollow shaft, the first support structure supports the hollow shaft at a location on the first support structure positioned radially outwardly from the main axis of rotation and the first and second rolling bearings, such that the first and second rolling bearings are located radially closer to the main axis of rotation than the location on the first support structure where the hollow shaft is supported.

2. The bearing arrangement according to claim 1, wherein a contact angle of at least one of the first and second rolling bearings is angled in relation to the main axis of rotation (R).

3. The bearing arrangement according to claim 1, wherein a contact angle of the first rolling bearing and a contact angle of the second rolling bearing are angled in relation to the axis of rotation, wherein the first rolling bearing is configured to axially locate the first support structure in relation to the second support structure in a first axial direction (D1), and the second rolling bearing is configured to axially locate the first support structure in relation to the second support structure in a second axial direction (D2), the second axial direction being opposite the first axial direction.

4. The bearing arrangement according to claim 2, wherein the contact angle (ca1, ca2) of at least one or both of the first and second rolling bearings is between 5 and 90 degrees.

5. The bearing arrangement according to claim 1, wherein a first pressure center of the first rolling bearing and a second pressure center of the second rolling bearing are separated in the axial direction by a pressure center distance (B).

6. The bearing arrangement according to claim 1, wherein the first rolling bearing comprises a rotating ring with a raceway for a first set of rolling elements and a non-rotating ring with a raceway for the first set of rolling elements, and the second rolling bearing comprises a rotating ring with a raceway for a second set of rolling elements and a non-rotating ring with a raceway for the second set of rolling elements.

7. The bearing arrangement according to claim 6, wherein the rotating ring of the first rolling bearing and the rotating ring of the second rolling bearing are mounted to the first support structure, and the non-rotating ring of the first rolling bearing and the non-rotating ring of the second rolling bearing are mounted to the second support structure.

8. The bearing arrangement according to claim 1, wherein the first and second bearings are axially displaced in relation to each other by an axial bearing distance (C) defined between axial centers of the first and second rolling bearings, wherein the axial bearing distance (C) is one of
within a distance corresponding to an outer radius of the second rolling bearing,
within a distance corresponding to the axial extension of the second rolling bearing,
within a distance corresponding to 50% of the axial extension of the second rolling bearing,
within a distance corresponding to 20% of the axial extension of the second rolling bearing.

9. The bearing arrangement according to claim 1, wherein a bearing radial distance (A) equals or exceeds a distance corresponding to an axial extension of the second rolling bearing,
equals or exceeds a distance corresponding to 50% of an outer radius of the second rolling bearing,
equals or exceeds a distance corresponding to the outer radius of the second rolling bearing,
equals or exceeds a distance corresponding to 150% of the outer radius of the second rolling bearing,
equals or exceeds a distance corresponding to an outer diameter of the second rolling bearing,
equals or exceeds a distance corresponding to 200% of the outer diameter of the second rolling bearing.

10. The bearing arrangement according to claim 1, wherein the first support structure is disc-shaped and provides a first bearing seat having a seating surface that is configured to retain a rotating ring of the first rolling bearing by abutment, and a second bearing seat with a seating surface that is configured to retain a rotating ring of the second rolling bearing by abutment, and wherein
the first and second bearing seats partially axially overlap and radially separated in relation to each other.

11. The bearing arrangement according to claim 1, wherein at least one of the first and second rolling bearing is a tapered roller bearing, a spherical roller thrust bearing, an angular contact spherical roller bearing, a toroidal roller bearing, an angular contact toroidal roller bearing, a cylindrical roller bearing, an angular contact ball bearing, or a ball bearing with groove.

12. An electric machine comprising:
the bearing arrangement of claim 1 further comprising:
wherein the frame forms an electric machine housing,
a rotor is disposed on the first support structure, and
a stator is disposed on the second support structure, the stator, cooperates with the rotor during operation.

13. The electric machine of claim 12, wherein the stator and the rotor are radially outside of the first rolling bearing and the second rolling bearing.

14. The electric machine of claim 13, wherein the stator is attached to a radially outermost portion of the second housing structure and the rotor is positioned radially outside of the second housing structure.

* * * * *